United States Patent Office.

HAYDN M. BAKER, OF WASHINGTON, DISTRICT OF COLUMBIA.

Letters Patent No. 102,906, dated May 10, 1870.

IMPROVEMENT IN THE MANUFACTURE OF SOAP.

The Schedule referred to in these Letters Patent and making part of the same

To all whom it may concern:

Be it known that I, HAYDN M. BAKER, of Washington, in the District of Columbia, have invented a new and useful "Process for obtaining the Soaps, formed by the action of hot alkaline and silicate solutions, upon the oils and fatty substances contained in cotton waste and other fibrous matters which have been used for packing journal-boxes and cleansing machinery;" and I hereby declare that the following is a full and exact description thereof.

This invention includes the extraction of soaps which have been formed by treating cotton waste and fibrous substances saturated with saponifiable oils, which cotton waste or other fiber has been used as a vehicle and reservoir in journal-boxes, to retain and distribute said oils for lubricating purposes, or for wiping machinery to remove the oils which have answered the purpose for which they were applied.

That it may be more clearly understood, I will state that it is now common to treat saturated cotton waste with a boiling solution of caustic soda, or potash, or with a solution of silicate of soda, or potash.

When the oils contained in the waste or fibrous matter are saponifiable, and this treatment is applied, a large percentage of the oils are converted into oleic, margaric, or stearic acids, and combined with the alkalis direct, or with the alkali of the silicate, and also the silica forming soaps which remain in solution.

This solution is of a deep wine color, and is also more or less mixed with substances destitute of detergent properties, and it is the object of this invention to remove those foreign bodies and displace the soap from the solution.

To accomplish this, I use chloride of soda (not chloride of sodium) in solution, or it may be more desirable to use chloride of lime, or chloride of potassa solutions, but as the most common alkali used in cleaning cotton waste is soda, or its salts, I prefer the use of chloride of soda.

The only agents in the way of apparatus necessary, is a kettle sufficiently large to receive the saponaceous liquor left by the treatment of cotton waste, &c. This kettle to be set in brick work, or in any other way that will admit of its attaining a sufficiently elevated temperature to boil the contents of same when received by it.

The remaining portion of apparatus consists of the usual soap-frames.

I will now describe the manner of proceeding.

I run into the kettle any quantity of the saponaceous liquor herein referred to, and saturate it with sufficient chloride of soda solution to change the color of said solution from a dark wine color to a very light straw color.

This is to be done while the liquor is cold, and the temperature is then to be gradually raised to boiling, and that boiling continued until the granulation is complete and the soap rises to the surface.

The soap is now to be run off into frames and when dry is to be cut into bars in the usual manner, or otherwise disposed of according to the pleasure of the operator.

I desire to state that the chlorates and perchlorates also effect the transformations above described, and so also do many other oxidizing agents, but that their use is not practical on account of their increased cost over chloride of soda, or lime.

In order that my claim may be completely understood, I will proceed to explain the theory of the process.

We will commence with the soap solution which has been described.

When we saturate this solution with chloride of soda; the oxygen of the said chloride of soda combines with the hydrogen of the coloring matter and destroyes its chemical constitution, leaving a substance which nearly approaches whiteness in color, and at the same time the chlorine combines with the sodium of the soda, forming chloride of sodium (common salt) which displaces the soap from the solution, while the boiling drives off the water and increases the density of the remaining solution to such an extent that the soap rises to the surface on account of its lesser specific gravity.

The object in applying the chloride of soda solution in the cold, and raising the temperature gradually, is to avoid the use of an unnecessary quantity of said chloride of sodium, and also to retain the foreign bodies in solution, and completely displace the soap.

Claim.

What I claim as my invention, and desire to secure by Letters Patent, is—

1. The process herein described for separating soaps from the solutions produced by the treatment or cleansing of cotton and fibrous waste.

2. As an article of manufacture, soap made from the oils and fatty substances contained in spent or exhausted cotton waste, and by the process herein set forth.

HAYDN M. BAKER.

Witnesses:
E. A. THURSTON,
I. K. SMITH.